(12) United States Patent
Patton (10) Patent No.: US 6,393,020 B1
(45) Date of Patent: May 21, 2002

(54) GATED MULTI-DROP COMMUNICATION SYSTEM

(75) Inventor: Paul B. Patton, Rockford, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/087,021

(22) Filed: May 29, 1998

(51) Int. Cl.[7] .............................................. H04L 12/50
(52) U.S. Cl. ..................... 370/362; 370/364; 370/502
(58) Field of Search ................................ 370/362, 364, 370/502, 432, 449, 451, 458; 710/101, 113, 126

(56) References Cited

U.S. PATENT DOCUMENTS

| | | | | |
|---|---|---|---|---|
| 4,868,814 A | * | 9/1989 | Berkovich et al. ............. | 370/67 |
| 5,499,188 A | * | 3/1996 | Kline, Jr. et al. ............ | 364/468 |
| 5,666,480 A | * | 9/1997 | Leung et al. ................ | 395/180 |
| 6,047,222 A | * | 4/2000 | Burns et al. ................... | 700/79 |

* cited by examiner

*Primary Examiner*—Hassan Kizou
*Assistant Examiner*—Thien Tran (57) ABSTRACT

A method and system for allowing multiple local simple communication buses to be selectively and separately connected as part of a larger, global communication bus. This interconnection is done transparently to the local buses, which may continue to operate autonomously and employ readily available and low cost devices based on time division multiplexing (TDM) protocol. A number of such TDM local buses are each provided with a switching device. A global bus and controller connects to each of the local bus switching devices. By uniquely addressing each switching device, the global controller can receive and transmit on any selected local bus, and issue commands to specific devices thereon. In a rapid fault polling mode, each local bus switching device is commanded to check its local bus devices for fault codes, and signal the presence thereof to the global controller, which can then access the local bus(es) which have the faults.

18 Claims, 5 Drawing Sheets

GATED MULTI-DROP COMMUNICATION SYSTEM

FIELD OF THE INVENTION

This invention relates data communications devices and systems, and in particular to a system for selectively interconnecting multiple low-cost local communication buses to a larger, global communication bus.

BACKGROUND

Data communication systems have been developed having a wide variety of capabilities and costs. Different configurations are available for a wide variety of applications in the fields of data communication and control. Some systems have been developed having extensive capabilities in terms of performance and the ability to be expanded to very large networks of devices to be controlled or communicated with. Unfortunately, such systems often are very expensive, and are therefore better suited to applications where their performance advantages are essential. Other system have been developed in the prior art for data communications and control over a small, essentially local collection of devices. Such systems can provide good performance for their intended tasks, while avoiding much of the high cost and complexity of large systems.

An example of such a low cost system is the time division multiplexed (TDM) single pair, or half-duplex communication buses and devices which have been developed in the field of building management systems. Such systems may use one or more such local buses to monitor and control burner systems and related components in a heating system. Such systems are small and essentially local in nature, and support only a limited number of device types. Each device type has a set time slot, from a starting marker, to broadcast data about itself onto the bus. Other devices, such as displays or controllers are designed to listen for and use the information from certain types of devices, occurring at certain time slots. For example, a burner control may transmit bursts of data in its time slot giving current operating parameters, and a display module is designed to listen in that time slot, then display the data. The TDM approach is useful in keeping costs and complexity down, because it avoids the complexities of addressing schemes, token communication protocols, polling, and the like. However, a shortcoming of such systems is limited expandability. Because it is based on the premise of each device type having a fixed time slot, multiple such devices cannot be supported on the same bus.

The prior art has attempted to address this limitation by providing a control or communication device as one of the time-slot device types in the local bus, then connecting the control/communication device into a larger communication system, by providing a data telephone line or a computer card interface. While successful, such prior art systems also run into limitations in that it becomes expensive to provide phone lines or computer interface cards for more than about six or so local buses. This may work for medium-sized installations, but is problematic for large installations such as factories, where there may be perhaps fifty or more burners to monitor. This would lead to a proliferation of computers or phone lines, and the attendant cost and complexity. The only other alternative would be a fully addressable network for all devices, which would also entail significant costs, and would give up the advantages of the simple and established TDM bus system.

SUMMARY OF THE INVENTION

The present invention provides a method and devices for allowing multiple local simple communication buses to be selectively and separately connected as part of a larger, global communication bus. This interconnection is done transparently to the local buses, which may continue to operate on a simple and low cost protocol. This permits the use of readily available and low cost monitoring/control devices, thus preserving system economy.

According to one aspect of the invention, a communication system is provided, including a plurality of local bus systems, each having a communication bus and a plurality of devices connected thereto and operative to communicate on the local communication bus. A plurality of switch devices are provided, each connectable to one of the local communication buses, and to a global communication bus. A controller is connected to the global communication bus and operative to transmitting signals thereon addressed to multiple or selected individual switch devices. A selected switch device is operative in response thereto to connect its local communication bus to the global communication bus for transmission of signals therebetween.

According to another aspect of the invention a fault polling mode of operation is provided, used where at least some of the devices on the local communication buses generate fault codes in response to detected fault conditions, wherein the communication system controller is operative in a fault polling mode to transmit a fault polling command to the switch devices, and wherein the switch devices are operative to check their local bus systems for faults and to provide an indication thereof to the controller.

According to another aspect of the invention used where the local communication bus systems operate on a local synchronous protocol, and wherein the controller addresses the switch devices in an asynchronous mode of operation, then communicates with a selected local bus in its synchronous protocol.

DESCRIPTION OF THE PREFERRED EMBODIMENT

Figure 1:
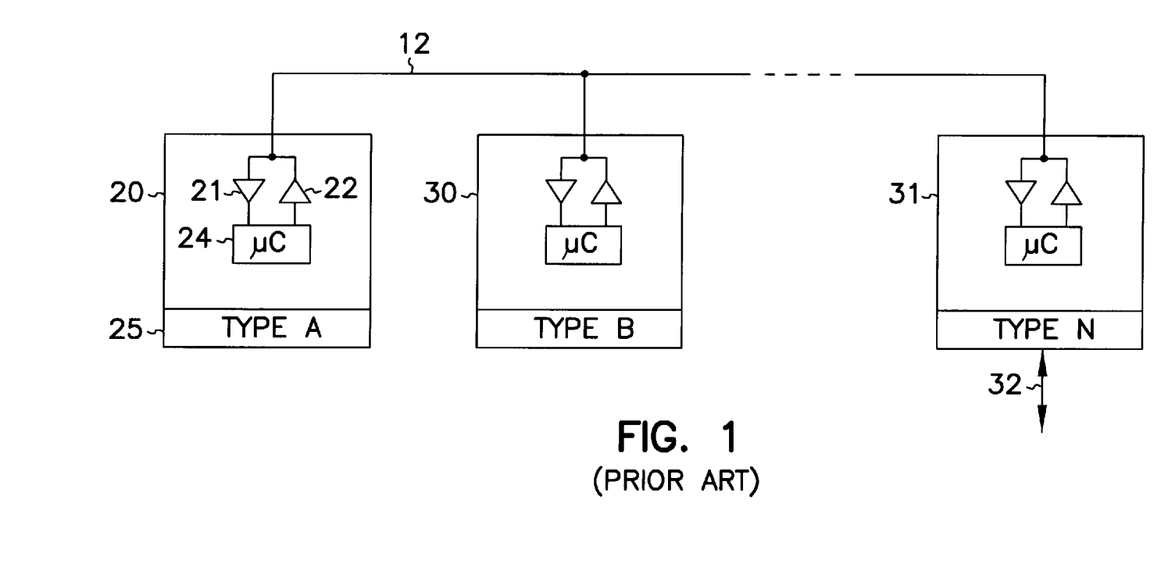
FIG. 1 schematic illustration of a simple TDM bus as is known in the prior art, and which may be used in conjunction with the system and method of the present invention.

Prior to describing the method and system of the present invention, the operation of a prior art TDM bus will be described with reference to FIGS. 1 and 2, because a plurality of such buses are used as subnets in the system of the present invention. In FIG. 1, TDM bus system 10 includes a number of local devices indicated by reference numbers 20, 30, 31, all connected to the bus 12. In practice there can only be a relatively small number of such devices for a bus of this type, because of time slot considerations. In the type of system used in burner controls used herein as the example of the application of the invention, the TDM buses have six defined device types, although a greater or lesser can be provided for in other designs. Not all device types must be present in a given bus, but no more than one of each type may be present.

For illustration purposes three device types are indicated, labeled Type A, Type B and Type N. As is indicated for device 20, each device has a line transmitter 21 and a line receiver 22 connected to bus 12. A microcontroller 24 connects for controlling the communication to and from the bus, and connects to other circuitry 25 as may be dictated by the purpose of the device type. In the case of burner systems, the Type A device may be the burner control, in which case it will involve monitoring of a plurality of status and operating parameters, plus the ability to respond to some control inputs. Type B might be a display, designed to receive the burner control's data from bus 12, and display it on a display panel for an operator to observe. Other types of devices may also be provided, as is generally known, including a device such as Type N which may be an interface device, for data connection between the bus 10 and another other data system or computer as indicated by communication line 32.

Figure 2:
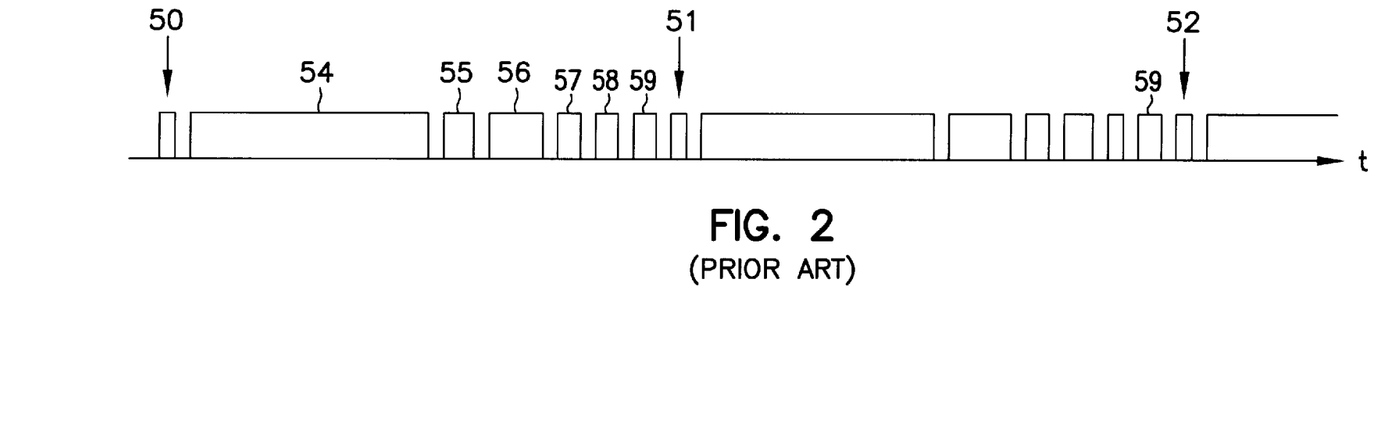
FIG. 2 is a timing chart illustrating the operation of the bus of FIG. 1.

FIG. 2 shows an example of a timing chart for the TDM communications of the devices on bus 12. Reference number 50 shows a marker or 'heartbeat' signal which is put on bus 12 to start and synchronize the time slots. One of the device types is designed to issue such markers. The other device types receive it, then synchronize their transmissions or listening periods from it. Following marker 50, and before the next marker 51, a number of time slots 54–59 are defined, separated by small guard bands of quiet time. It is not necessary that the time slots be equal, and in most cases they may be unequal, because of the nature of the types of data each device type may handle. For example, if the type A device 25 is a burner control, it would typically need a longer time slot to transmit data than a device type for a display, which primarily receives data from the other devices. What is important is that the time slots are fixed, so that each device will operate within its own time slot, and two devices will not try to transmit at the same time.

Marker 51 may start another set of time slots, as can marker 52, and so on, and the devices on the bus report status continuously in their time slots. The number of time slots can be increased by providing for a specific bit in the marker which toggles odd or even on each repetition. Some device types can be designed to transmit only on odd or even marker initiated times. Other devices having data which must be updated more frequently may be designed to transmit on each type of period. The scheme shown in FIG. 2 is only one example. In FIG. 2, the period starting with marker 51 has a different time slot line-up than for marker 50, and 52 would be identical to 50. If more time slots are needed, additional bits can be provided in the marker to provide three or more different time periods.

All devices on the bus start a timer after the marker, and some also note whether it is an even or odd interval. When the device's transmit time comes, the device transmits a message. This includes the ID of the device, a byte count for the message, fields of data pertinent to the device, possibly including fault codes for problems detected, and a checksum for data integrity. The device then remains quiet until the next time slot interval.

All devices receive all messages on the bus, but only certain ones respond to them. For example, a display device will respond to data from a burner control device and display it. Also a burner control will respond to certain messages that contain a command for the burner control, and which may tell it to remain off, to turn on, or to go to various other operating modes.

As previously mentioned, an advantage of the type of bus of FIG. 1 is its simplicity and low cost. Its disadvantage is the limitation of how many devices can be connected. The prior art provided for connection of up of six such buses by providing a controller card for each bus, connected to a computer. However, for even larger system, this approach becomes unwieldy.

Figure 3:
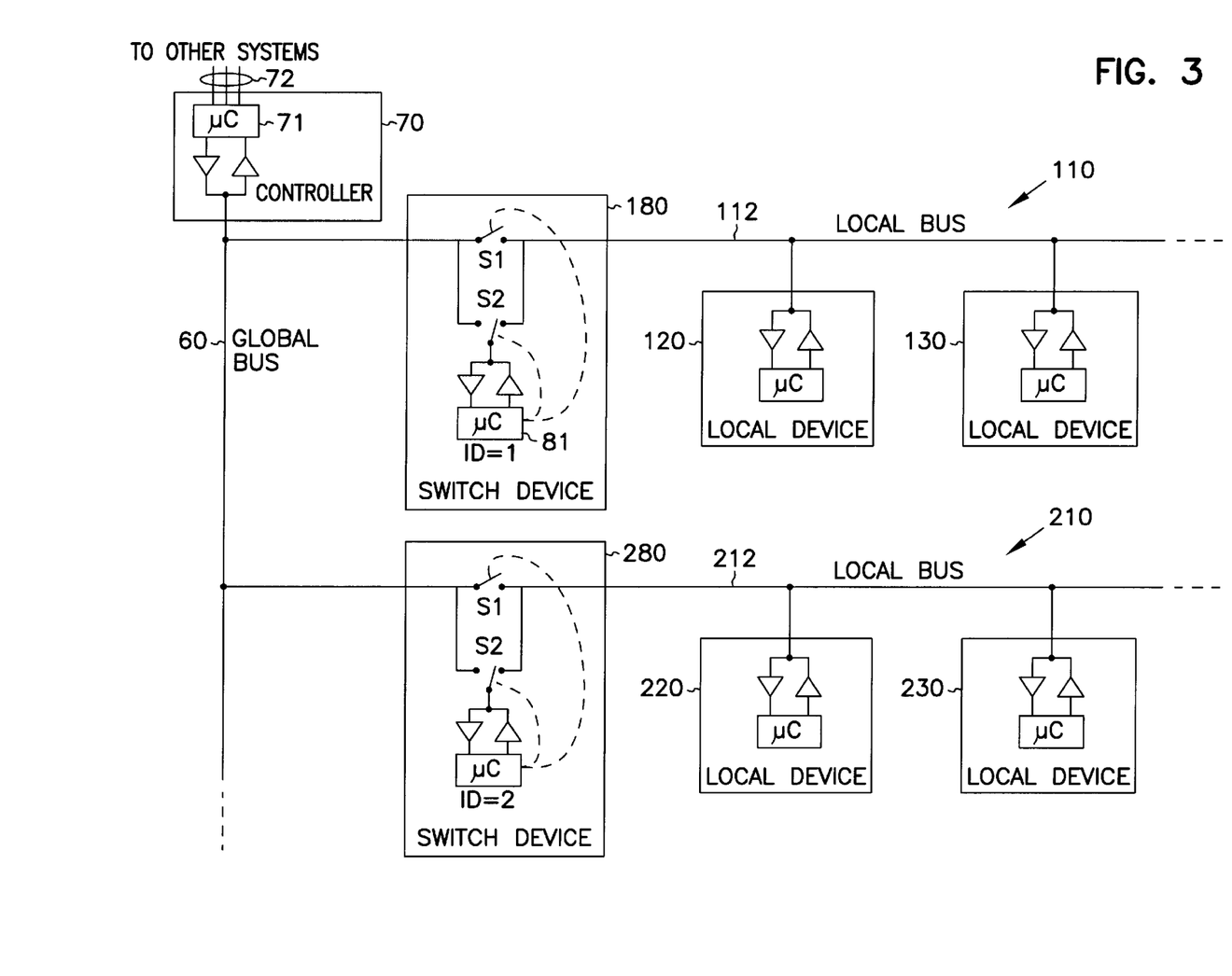
FIG. 3 is a schematic block diagram of the system of the present invention.

The present invention solves this problem by providing a gated multi-drop communication system, organized as shown in overview in FIG. 3. This system allows a large number of local communication buses to be separately and selectively connected to a global communication bus. In FIG. 3, local buses 110 and 210 are the same type of TDM bus systems as bus system 10 of FIG. 1, previously described. Two such bus systems are shown in the Figure, and it will be understood that a large number may be used. For example, in one embodiment, up to 63 local buses can easily be controlled. This number is does not represent any theoretic limit, but only a practical choice of size to accommodate most uses. Each local bus is selectively connected to a global bus 60 which connects to a controller 70, and from there can be connected for data exchange with other systems (not shown) via connections 72. Such other systems may include, for example, building management systems and the like. The local buses may include burner control devices, displays and annunciators.

Each local bus 110, 210, . . . n10 has a switch device 180, 280 . . . n80 connecting it to the global bus 60. As represented in FIG. 3, each switch device has a logical switching function S1 under control of an on board microcontroller 81. This switch function permits the connected local bus to be connected to the global bus. This is used for system monitoring and control, as described in greater detail below. The local buses will therefore be referred to as subnets of the global net.

In addition, each switch device 180, etc has a logical switch function S2 under the control of the microcontroller 81, which allows the microcontroller to connect to either the global bus or the local bus. This switch function is used for fault polling, as described in greater detail below.

In overview, it is important to note that each local bus behaves the same as it would in a stand-alone local TDM bus such as in the prior art. The global communication is taken care of by the global bus functions of this invention, and there is no need to redesign any special features into the local buses. Each device on a local bus 110, 210, . . . n10 transmits in its own time, and certain devices 'listen' and respond as in the case of FIG. 1. Each local bus operates autonomously and asynchronously to the other buses, just as if it were a standalone bus.

Figure 4:
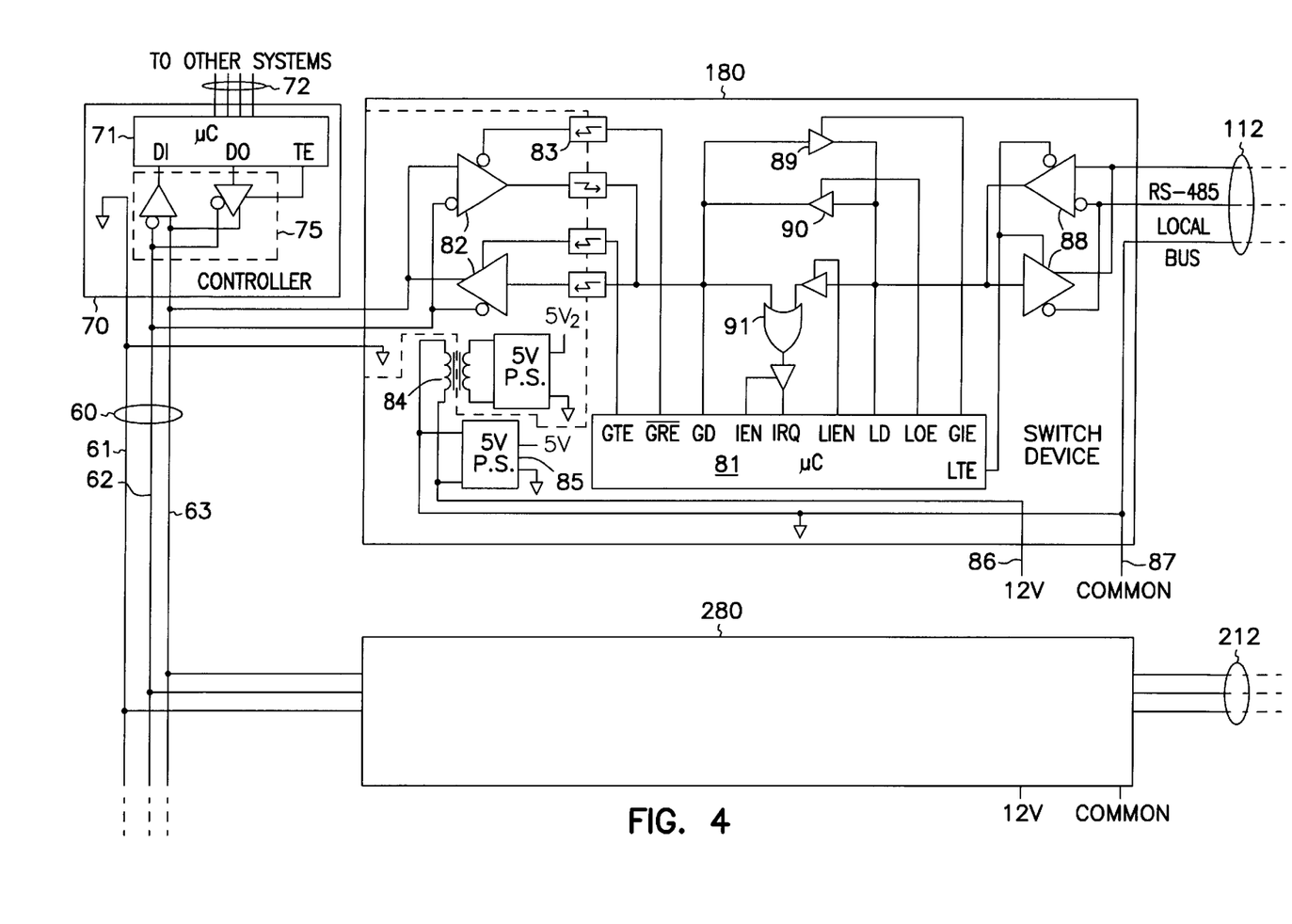
FIG. 4 is a diagram similar to FIG. 3 but showing greater implementation detail.

Implementation details of the gated multi-drop communication system of the present invention are shown in FIG. 4. In one preferred embodiment global bus 60 operates as a 4800 baud RS-485 communications bus containing signal ground line 61, and a data line pair 62, 63. This is only one example, and many other types of buses may used as well. The controller 70 includes a microcontroller 71 which has a connection 72 for connection to a larger system, and data input (DI) and data output (DO) ports and a transmit enable (TE) port connected to a RS-485 transceiver 75. Devices for transceiver 75 are typically implemented as a single chip and are readily available on the market, and can implement half-duplex communication over the line pair 62–63. Some such devices can drive a load of 32 devices which can be extended with repeaters. Other devices can handle more than 32 devices without repeaters. The invention may be implemented with whatever number of subnets is desired.

Each switch device such as 180 has a microcontroller 81 with associated memory used for holding instructions and data. It also includes a pair of RS-485 transceivers, indicated by reference numbers 82 and 88. These include a pair of transmit/receive drivers and associated components, but since they are usually included in a single chip, the reference number 82 is used for the whole transceiver. Transceiver 82 connects to the data line pair 62, 63 of the global bus, and transceiver 88 connects to local bus 112 of the subnet, which is also a RS-485 protocol bus in the preferred embodiment.

Because the global network can extend over a considerable distance, for example 4000 feet and even between buildings which might be on different electrical power services, it is good practice to electrically isolate the global and local buses. The switch device has a power supply 85 connected to ground and power at 86, 87, but is isolated from the global bus and controller 70. A transformer 84 and opto-isolators (one of which is indicated by reference number 83) are used for this isolation. Transceiver 82 receives its power from transformer 84, and is connected to the signal ground 61 of the global bus.

Control lines (not numbered) are provided from microcontroller 81 to both of transceivers 82 and 88 to control the transmit/receive modes of each. The control LTE (local transmit enable) connects to control the mode of transceiver 88, either to transmit or receive. The control signals to the global bus transceiver are from outputs GTE (global transmit enable) and GRE (global receive enable). These are separate, because there are some instances, for example listening to the local bus when it is necessary to neither transmit nor receive from the global bus.

Data from the global bus is passed through leads to the GD (global data) port of the microcontroller 81. Data from the local bus can be received and read in on the LD (local data) port. However, it may be more convenient in terms of software implementation to use gates 89, 90 and associated components and connections, to bring in the local data to the GD port. Gates 89 and 90 are tri-state buffers, having a low, high or open output. These can be used to connect the global bus GB to the local bus LB, or vice versa. This represents the S1 function of FIG. 3. The S2 function can be implemented by having the microcontroller 81 'listen' to either GD or LD. However, as mentioned above, it may be simpler to implement having both listening processes done through GD, with the gates 89, 90 switched appropriately, and with the global and local transceivers switched accordingly.

Switch device 180 has two logical states, represented in FIG. 3 by S1 being open, or closed. In the actual implementation of FIG. 4, this logical state is stored in memory in microcontroller 81. When S1 is logically open, microcontroller 81 usually listens for commands from controller 70 received via global bus 60. When S1 is logically closed, microcontroller 81 monitors both buses via a mechanism provided by interrupt IRQ, interrupt enable (IEN), local interrupt enable (LIEN), OR gate 91 and its connected gates. These are used to sense the direction of the flow of data, that is, from global bus to local bus, or local to global. This is implemented as follows: When switch S1 of FIG. 3 is logically closed, but during the time gaps when neither side is actually transmitting, a start bit of a byte from either the local bus or global bus will appear at IRQ via OR gate 91. The interrupt response of the microcontroller 81 is almost instantaneous, compared to the data rates on the buses, so that the microcontroller can look at GD and LD to see which way the data is coming from. The appropriate transceiver switching is then done during the time of the start bit, so that it and the following byte will be sent out the appropriate bus. Once started, the direction is maintained at least the time of a full byte for as long as transitions continue to occur. When no changes have been detected for slightly more than the time needed to transmit one byte, then the microcontroller goes back to waiting for the next start bit.

Each switch device has a unique ID so that it can be uniquely addressed by controller 70. There are many ways to accomplish this, but one simple way is to provide a unique number, such as a serial number, in non-volatile memory in each switch device manufactured. For example, a three byte number can be used, which will give approximately 16 million unique numbers.

Controller 70 keeps a copy of the serial numbers of known switch devices in its nonvolatile memory. These serial numbers are obtained via a polling process that is initiated by an operator when configuring a new or changed multi-drop system. A polling process to survey devices on a bus can be done many ways, as is generally known. Sequential subnet ID numbers, for example 01 through 63 are then assigned to the switch devices. Using a serial number form of addressing, the controller addresses each switch device, and transmits its assigned subnet ID number, which is then placed in nonvolatile memory in the switch device. Thereafter during normal operation controller 70 addresses each switch device uniquely by subnet ID number.

When a system of FIG. 4 is first powered up, controller 70 uses a similar polling process to build another table of the serial numbers and assigned subnet IDs of all switch devices present on the global bus. Controller 70 compares the result of the power up polling to the table stored in nonvolatile memory, and can provide an alert to an operator if there is a mismatch. This could occur, for example because someone may have disconnected, added or replaced a switch device without reconfiguring.

In operation, controller 70 may access any of the local buses. When all of the S1 switches are open, controller may act asynchronously in issuing commands without regard to the timing considerations existing anywhere else in the system. When a S1 switch is closed, the data from the selected subnet appears also on the global bus. Therefore, when a S1 is closed, controller 70 must operate synchronously with the selected local bus. Controller 70 has a defined time slot on each local bus to transmit, when all the other device types on the local bus are quiet. This can be one of the otherwise unused time slots in FIG. 2, for example time slot 59. By listening to a cycle of traffic on the local bus, controller 70 can synchronize to it, and must then use only its time slot for transmitting. Thus, if the controller needs to issue a command to a device on the local bus, it does so in this time. Also, if it needs to issue a switch device command to select another subnet switch device, it must use this time slot. All switch devices listen to the global bus, regardless of whether they have their S1 switches open or closed.

When a switch device initially receives a command directed to its own subnet ID to select it for connection, the selected switch device confirms this by transmitting its ID three times. This acknowledges the selection and lets the controller know that no error has occurred in the process, such as might be caused by noise and which might result in erroneous connection to a wrong subnet. This acknowledgment transmission ID occurs only on a change in subnet selection, but not on the reconfirmation thereof, discussed below.

After controller 70 has sent a command to a selected subnet ID which causes a selected switch device to close its switch S1 and causes all nonselected switch devices to open their S1 switches, a timeout timer is started in the selected switch device. Controller 70 must periodically resend this command to the selected subnet ID to maintain the selection thereof. The purpose of this is to recover from a condition wherein two subnet switch devices have their S1 switches closed at the same time. This is not supposed to happen, but if it did due to some kind of noise or error, the transmitted traffic from the two subnets would create chaotic signals on the global bus, in which reliable transmission of a message may not be possible. In this case controller 70 implements a recovery by remaining quiet, and after the timeout time, both subnet switch devices would time out and open their S1 switches, thus clearing the error condition.

To illustrate the process of selecting and accessing a local bus, assume that, each of the switch devices 180, 280, n80 has its switch S1 logically open, and its switch S2 logically connected for listening to the global bus. Controller 70 may send a signal down the global bus 60 addressed to a subnet ID number of one of the switch devices 180, n80. In response, the addressed switch device closes its S1 and all non-addressed switch devices open theirs. When this happens, the local TDM data on the selected subnet now appears on global bus 60. Since this may occur at any point in the time slot cycle of the local bus, the controller 70 would listen for more than the time for a complete cycle, or two complete cycles if odd/even cycles are used. This ensures that all data on the local bus will be received. Controller 70 can collect all data from all devices on the selected subnet, and the data can be stored, analyzed, or forwarded to other systems as desired.

Controller 70 can also send commands to specific devices in specific subnets. For example in a preferred form of a system according to the invention, time slot 56 of FIG. 2, which is a legacy time slot used for an interface card in a local bus, can be used for this function. This might be done, for example, if the larger building management system wanted to turn off or modify the operation of a burner in a certain part to the building. The subnet is selected as described above, and the appropriate command can be sent in time slot 56, for example.

Depending on the number and timing of subnets and system data rates, a problem could develop in the responsiveness of the system to fault or alarm conditions. With the data rate of 4800 baud, a complete time slot cycle of one second or so for the subnets, as many as 63 subnets, and in the worst case of reading each subnet sequentially in round-robin polling, then as much as 90 seconds could pass before the controller 70 and the systems it connects to will learn of the fault. For some types of faults, this is not acceptable. For example, if a burner were to have a fault, it would be important to have that information available at controller 70 within a few seconds, especially since it will be available and displayed at the affected local bus within a second or so. To solve this problem, the invention provides a fault polling mode to quickly to report faults.

The system periodically suspends subnet connections responsive to requests by the connected larger system, and performs a special fault poll. This can be done, for example once every approximately ten seconds. If the interval is longer, the response time for reporting faults goes up. If quicker response is desired the polling interval can be reduced, but if the interval is too short, it begins to interfere with normal subnet access.

Figure 5:
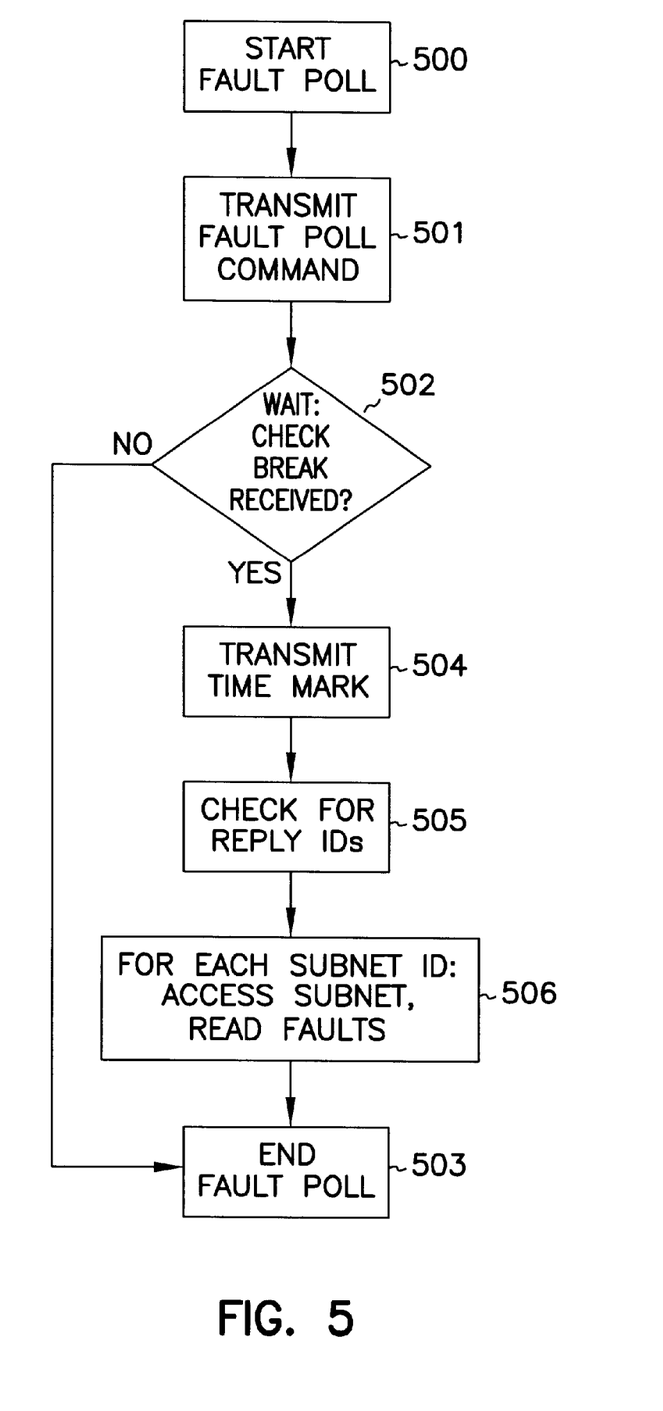
FIG. 5 is a flow chart illustrating fault detection on the global network.

As previously mentioned, some of the devices on the local buses include fault codes in their time slot transmissions. Each switch device 180, n80 has the ability to monitor those fault codes, and to detect when they differ from their status the last time they were monitored. FIG. 5 illustrates the fault polling technique of the present invention. At step 500 the global controller 70 starts a fault poll. At step 501, it transmits a special fault poll command on the global bus 60. Each switch device n80 on the global network responds by listening to its local subnet for a fixed period of time then transmitting a break signal if it has changed fault status to report. This is explained in greater detail below with reference to FIG. 6. At step 502, controller 70 waits, then checks for a break signal. If there are none, control passes to step 503, the end of the fault poll.

If at step 502 there is a break signal, control branches to step 504. The electrical nature of the signals from the transceivers on line 60 is that one or more break signals from different subnets is detected like a single break, or perhaps a long break if there is time overlap. Therefore a break indicates that one or more subnets have changes in faults.

At step 504 controller 70 transmits a special time mark command on bus 60 for fault ID polling. All subnet switch devices receive this, and each switch device having a fault change to report transmits its subnet ID number, in a unique ordered time slot which corresponds to its subnet ID. These are received at step 505, and from this controller 70 knows which subnet or subnets have fault changes. At step 506, controller 70 addresses one of such subnets to close its S1 switch, and controller 70 can read the transmitted data from all devices on the subnet, including fault codes and appropriate action can be taken by way of message transmitted over 72 to the larger control system. This is repeated for all subnets that reported fault changes. Then the fault poll ends at step 503.

Figure 6:
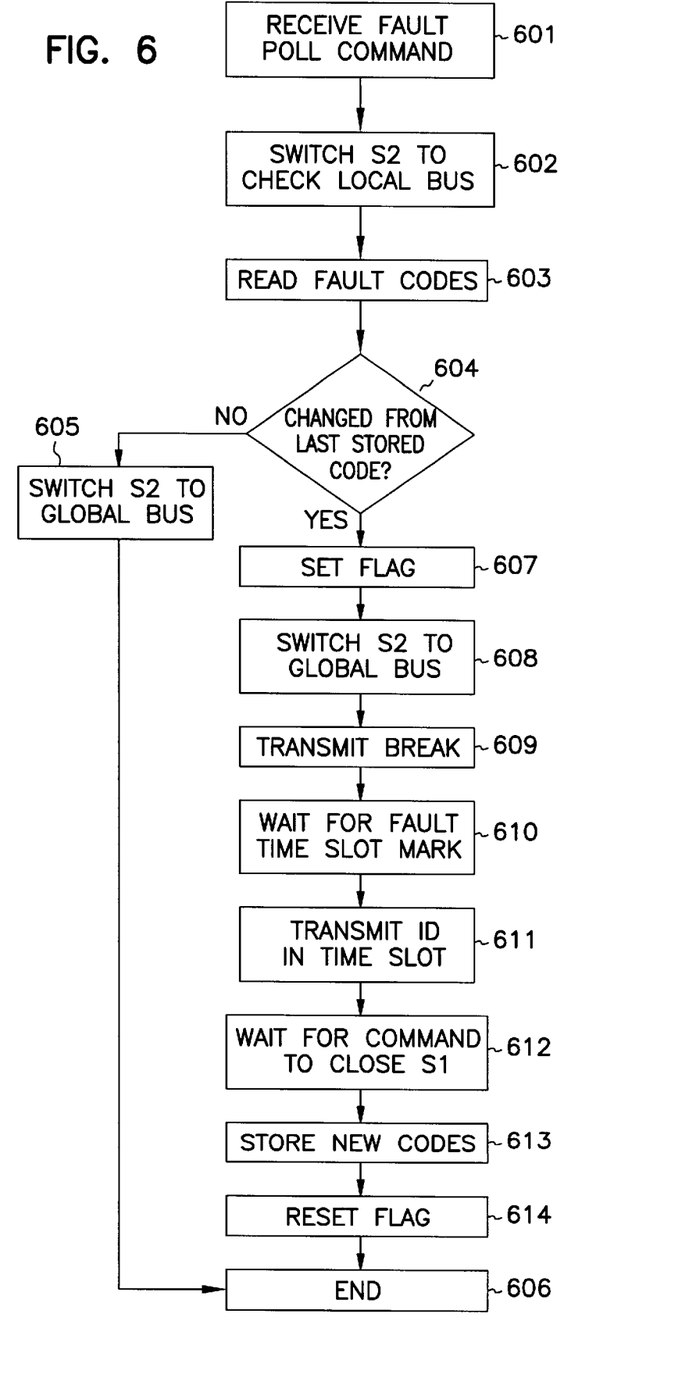
FIG. 6 is a flow chart illustrating fault detection in a subnet.

FIG. 6 illustrates the fault polling process at the subnet switch device level, using the first subnet of FIG. 3 as an example, it being understood that the same process occurs at all the subnets. At step 601 the switch device 180 receives a fault poll command from controller 70, which is step 501 of FIG. 5. At step 602 the switch device switches its S2 to listen to its local bus 110, and at step 603 it reads the fault codes of all its device types which have them.

At step 604 these fault codes are compared to previous fault codes stored in memory earlier. If there is no change, control passes to step 605, at which it switches S2 back to the global bus and ends the routine at step 606.

If, however, there has been a change at step 604, control branches to step 607, where a flag is set. At step 608 switch S2 is switched back to the global bus, and at step 609 the switch device transmits a break signal on the global bus (This break would be detected by controller 70 at step 502 of FIG. 5.) At step 610 of FIG. 6 the switch device 180 waits for the fault time slot mark (step 504). In response, at step 611 the switch device transmits its subnet ID number at its ID-ordered time slot.

Control then passes to step 612, where it waits for a command from controller 70 to close its switch S1. This may come right away, or after other subnets. After receipt of the command to close S1, the switching device 180 stores new fault codes at step 613. Actually, the switch devices always store fault codes when they close their S1, so that the locally stored values will be the same as what was last made available on the global bus. The switch device then resets its flag at step 614, based on the assumption that controller 70 has now read the current fault codes from its subnet. The routine then ends at step 606.

There is a further back-up fault detection mode which is run infrequently, perhaps every ten minutes or so, whose purpose is to double check that no faults were missed in a fault poll. Consider a transmission error situation that might occur due to noise during the fault polling process, such that a changed fault was never received by controller 70, but the closure of S1 by the switch device of the subnet having the fault went ahead and stored the new fault value (step 613) and reset its flag (step 614). On the next fault poll, the switch device would not report any change in fault conditions, because the assumption would be that such change was transmitted on the previous fault poll. The result would be that the 'lost' fault would never be picked up be controller 70. To guard against this possibility, the system sends a fault reset command to all subnets. This causes them to clear their stored faults. The system then does a fault poll, as described above with reference to FIGS. 5 and 6. At step 604, every subnet which has a fault code will treat it as a change, because the previously stored codes have been cleared. All such subnets will report changes, and controller will access and read all fault codes. This procedure will ensure that no fault codes will go undetected for unacceptably long periods of time.

What is claimed is:

1. A communication system, comprising:
   a plurality of local bus systems, each having a communication bus and a plurality of devices connected thereto and operative to communicate in a local synchronous protocol on the local communication bus;
   a global communication bus;
   a plurality of switch devices, each connectable to the global communication bus and to one of the local communication buses, wherein each switch device includes:
      a microcontroller;
      a global transceiver coupled between the microcontroller and the global communication bus, the microcontroller providing at least one global enabling signal to the global transceiver, wherein the microcontroller and the global transceiver selectively connect the global communication bus to the microcontroller;
      a tristate buffer coupled to the global communication bus, the corresponding local communication bus, and the microcontroller, the microcontroller providing at least one buffer enabling signal to the tristate buffer, wherein the microcontroller and the tristate buffer selectively connect the global communication bus and the local communication bus;
   a controller connected to a global communication bus and operative to transmitting signals thereon addressed a multiple or a selected individual switch device, and the switch device operative in response thereto to connect its local communication bus to the global communication bus for transmission of signals therebetween; and
   the controller operative to communicate with a selected local bus in its synchronous protocol.

2. A communication system, comprising:
   a plurality of local bus systems, each having a communication bus and a plurality of devices connected thereto and operative to communicate in a local synchronous protocol on the local communication bus;
   a global communication bus;
   a plurality of switch devices, each connectable to the global communication bus and to one of the local communication buses;
   a controller connected to a global communication bus and operative to transmitting signals thereon addressed a multiple or a selected individual switch device, and the switch device operative in response thereto to connect its local communication bus to the global communication bus for transmission of signals therebetween;
   the controller operative to communicate with a selected local bus in its synchronous protocol; and
   wherein at least some of the devices on the local communication buses generate fault codes in response to detected fault conditions, wherein the communication system controller is operative in a fault polling mode to transmit a fault polling command to the switch devices, and wherein the switch devices are operative to check their local bus systems for faults and to provide an indication thereof to the controller.

3. A communication system, comprising:
   a plurality of local bus systems, each having a communication bus and a plurality of devices connected thereto and operative to communicate in a local synchronous protocol on the local communication bus;
   a global communication bus;
   a plurality of switch devices, each connectable to the global communication bus and to one of the local communication buses, wherein each switch device includes:
      a microcontroller;
      a global transceiver coupled between the microcontroller and the global communication bus, the microcontroller providing at least one global enabling signal to the global transceiver, wherein the microcontroller and the global transceiver selectively connect the global communication bus to the microcontroller;
      a local transceiver coupled between the microcontroller and the corresponding local communication bus, the microcontroller providing at least one local enabling signal to the local transceiver, wherein the microcontroller and the global transceiver selectively connect the local communication bus to the microcontroller; and
      a tristate buffer coupled to the global communication bus, the corresponding local communication bus, and the microcontroller, the microcontroller providing at least one buffer enabling signal to the tristate buffer, wherein the microcontroller and the tristate buffer selectively connect the global communication bus and the local communication bus;
   a controller connected to a global communication bus and operative to transmitting signals thereon addressed a multiple or a selected individual switch device, and the switch device operative in response thereto to connect its local communication bus to the global communication bus for transmission of signals therebetween; and
   the controller operative to communicate with a selected local bus in its synchronous protocol.

4. A gated multi drop communication system, comprising:
   a plurality of stand-alone local time division multiplexed (TDM) bus systems, each having a local TDM bus and a plurality of devices connected thereto;
   a global communication bus,
   a plurality of switch devices, each including a microcontroller, wherein each switch device has a logical switching function S1 under control of the microcontroller, wherein each switch device has a logical switching function S1 under control of the microcontroller for selectively connecting the local TDM bus to the global communication bus;

a controller connected to a global communication bus and adapted for transmitting signals thereon to one or more of the switch devices, and a selected switch device operative in response thereto to connect its local TDM bus to the global communcation bus for transmission of signals therebetween;

the controller operative to communicate with a selected local TDM bus;

the logic switching function S1 is provided by a first and a second tristate buffer coupled between the global communication bus and the local TDM bus;

the microcontroller provides a first buffer enabling signal to the first tristate buffer such that the microcontroller and the first buffer selectively control communication from the local TDM bus to the global communcation bus; and the microcontroller provides a second buffer enabling signal to the second tristate buffer such that the microcontroller and the second buffer selectively control communication from the global communication bus to the local TDM bus.

5. The gated multi-drop system of claim 4, wherein each switch device further has a logical switching function S2 under control of the microcontroller for selectively connecting the microcontroller to the global communication bus and for selectively connecting the microcontroller to the local TDM bus.

6. The gated multi-drop system of claim 5, wherein:

the logic switching function S2 is provided by a global transceiver coupled between the microcontroller and the global communication bus and by a local transceiver coupled between the microcontroller and the local TDM bus;

the microcontroller provides at least one global enabling signal to the global transceiver such that the microcontroller and the global transceiver selectively control communication between the microcontroller and the global communication bus; and the microcontroller provides at least one local enabling signal to the local transceiver such that the microcontroller and the local transceiver selectively control communication between the microcontroller and the local TDM bus.

7. A gated multi drop communication system, comprising:

plurality of stand-alone local time division multiplexed (TDM) bus systems, each having a local TDM bus and a pluraity of devices connected thereto;

a global communication bus;

a plurality of switch devices, each including a microcontroller, wherein each switch device has a logical switching function S1 under control of the microcontroller, wherein each switch device has a logical switching function S1 under control of the microcontroller for selectively connecting the local TDM bus to the global communication bus;

a controller connected to a global communication bus and adapted for transmitting signals thereon to one or more of the switch devices, and a selected switch device operative in response thereto to connect its locad TDM bus to the global communcation bus for transmission of signals therebetween;

the controller operative to communicate with a selected local TDM bus;

wherein each switch device further has a logical switching function S2 under control of the microcontroller for selectively connecting the microcontroller to the global communication bus and for selectively connecting the microcontroller to the local TDM bus; and wherein the logical switching function S2 is used in a fault polling mode of operation such that the controller transmits a fault polling command on the global communication bus, each switch device monitors the global communication bus and detects the fault polling command, and each switch device checks its local TDM bus system for faults and provides an indication thereof to the controller.

8. A gated multi drop communication system, comprising:

a plurality of stand-alone local time division multiplexed (TDM) bus systems, each having a local TDM bus and a plurality of devices connected thereto;

a global communication bus;

a plurality of switch devices, each including a microcontroller, wherein each switch device has a logical switching function S1 under control of the microcontroller, wherein each switch device has a logical switching fiction S1 under control of the microcontroller for selectively connecting the local TDM bus to the global communication bus;

a controller connected to a global communication bus and adapted for transmitting signals thereon to one or more of the switch devices, and a selected switch device operative in response thereto to connect its local TDM bus to the global communcation bus for transmission of signals therebetween;

the controller operative to communicate with a selected local TDM bus; and wherein each switch device includes a transformer and opto-isolators for isolating the local TDM bus and the global communication bus.

9. In a communication system comprised of a plurality of local TDM bus systems in which each local TDM bus system includes a local microcontroller and a local TDM bus, and further comprised of a global communication bus system that includes a global controller and a global communication bus, a method of selectively interconnecting a plurality of local TDM buses to a global communication bus, comprising:

providing a logical switch S1 which selectively connects the global communication bus to the local TDM bus;

maintaining a normally open logical switch S1 such that the local TDM buses operate as a stand-alone TDM communication system;

in response to receiving a local bus selection command, closing the logical switch S1 to connect the global communication bus to the local TDM bus; and synchronizing communication timing on the global communication bus to communication timing on the local TDM bus.

10. The method of claim 9, further including:

in response to receiving a local bus selection command, starting a timeout timer for opening the logical switch S1; and resetting the timeout timer upon receiving the local bus selection command again.

11. The method of claim 9, further including:

providing a logical switch S2 which selectively connects the local microcontroller to the global communication bus, and selectively connects the local microcontroller to the local TDM bus; and selectively closing the logical switch S2 to connect the local microcontroller to the global communication bus and monitor the global communication bus to detect a command.

12. The method of claim 11, further comprising:

selectively closing the logical switch S2 to connect the local microcontroller to the local TDM bus and detect a fault code transmitted by a device on the local TDM bus; and periodically performing a fault poll for the local TDM buses connected to the global communication bus, wherein a fault indication is provided to the global controller if the local microcontroller detects the fault code.

13. The method of claim 12, wherein periodically performing a fault poll includes:

transmitting a fault poll command on the global communication bus from the global controller;

in response to receiving the fault poll command, monitoring the local TDM bus to determine a fault status;

in response to determining that the fault status has changed, transmitting a signal on the global communication bus from the local microcontroller to the global controller;

in response to receiving the signal, transmitting a fault ID polling time mark on the global communication bus from the global controller to the local microcontroller;

in response to receiving the time mark, transmitting an ID number on the global communication bus in an ordered time slot from the local microcontroller to the global controller if the fault status has changed for the local TDM bus; and in response to receiving an ID number, closing the logical switch S1 to communicate fault codes on the global communication bus from the local microcontroller to the global controller.

14. The method of claim 13, wherein, in response to monitoring the local TDM bus to determine a fault status, the method further includes:

reading fault codes for devices having faults;

comparing fault codes to previously-stored fault codes; and in response to detecting a change in fault codes, setting a flag to transmit the break signal.

15. The method of claim 14, further including periodically transmitting a fault reset command on the global communication bus to clear previously-stored fault codes for each local TDM bus such that all fault-codes will be transmitted on the global communication bus during the next fault poll.

16. The gated multi-drop system of claim 7, wherein:

the logic switching function S2 is provided by a global transceiver coupled between the microcontroller and the global communication bus and by a local transceiver coupled between the microcontroller and the local TDM bus the microcontroller provides at least one global enabling signal to the global transceiver such that the microcontroller and global transceiver selectively control communication between the microcontroller and the global communication bus;

the microcontroller provides at least one local enabling signal to the local transceiver such that the microcontroller and the local transceiver selectively control communication between the microcontroller and the local TDM bus.

17. The gated multi-drop system of claim 8, wherein:

wherein each switch device further has a logical switching function S2 under control of the microcontroller for selectively connecting the microcontroller to the global communication bus and for selectively connecting the microcontroller to the local TDM bus.

18. The gated multi-drop system of claim 8, wherein:

the logic switching function S2 is provided by a global transceiver coupled between the microcontroller and the global communication bus and by a local transceiver coupled between the microcontroller and the local TDM bus the microcontroller provides at least one glob enabling signal to the global transceiver such that the microcontroller and global transceiver selectively control communication between the microcontroller and the global communication bus;

the microcontroller provides at least one local enabling signal to the local transceiver such that the microcontroller and the local transceiver selectively control communication between the microcontroller and the local TDM bus.

* * * * *